(12) United States Patent
Langner et al.

(10) Patent No.: US 9,225,955 B2
(45) Date of Patent: Dec. 29, 2015

(54) METHOD AND APPARATUS FOR PROCESSING OF MEDIA DATA

(71) Applicant: nrichcontent UG, Mannheim (DE)

(72) Inventors: Marc Langner, Mannheim (DE); Ilhan Sakinc, Muenster (DE); Serjik Margosian Khoygani, Seeheim-Jugenheim (DE)

(73) Assignee: nrichcontent UG, Mannheim (DE)

( * ) Notice: Subject to any disclaimer, the term of this patent is extended or adjusted under 35 U.S.C. 154(b) by 508 days.

(21) Appl. No.: 13/683,066

(22) Filed: Nov. 21, 2012

(65) Prior Publication Data

US 2013/0129315 A1    May 23, 2013

Related U.S. Application Data

(60) Provisional application No. 61/687,460, filed on Apr. 25, 2012.

(30) Foreign Application Priority Data

Nov. 23, 2011   (DE) .......................... 10 2011 055 653

(51) Int. Cl.
*H04N 9/80* (2006.01)
*H04N 9/87* (2006.01)
*G06F 17/30* (2006.01)
*G06Q 30/02* (2012.01)

(52) U.S. Cl.
CPC .............. *H04N 9/87* (2013.01); *G06F 17/3002* (2013.01); *G06F 17/30056* (2013.01); *G06F 17/30855* (2013.01); *G06Q 30/0241* (2013.01); *G06Q 30/0273* (2013.01)

(58) Field of Classification Search
None
See application file for complete search history.

(56) References Cited

U.S. PATENT DOCUMENTS

| | | | |
|---|---|---|---|
| 6,816,628 B1 * | 11/2004 | Sarachik et al. | .............. 382/285 |
| 2003/0149983 A1 | 8/2003 | Markel | |
| 2003/0167449 A1 | 9/2003 | Warren et al. | |
| 2007/0005795 A1 | 1/2007 | Gonzalez | |
| 2009/0094637 A1 | 4/2009 | Lemmons | |

(Continued)

FOREIGN PATENT DOCUMENTS

| | | |
|---|---|---|
| DE | 100 33 134 | 5/2011 |
| WO | 02/19719 A1 | 3/2002 |

(Continued)

OTHER PUBLICATIONS

Alex Chitu, "YouTube Annotations" dated Jun. 4, 2008.

*Primary Examiner* — Heather Jones
(74) *Attorney, Agent, or Firm* — Collard & Roe, P.C.

(57) ABSTRACT

The invention relates to a method and an apparatus for processing of media data (3), as well as to corresponding management of the processed media data (3). Proceeding from a state of the art that makes it possible to provide media data with additional product and advertising information with regard to selected objects, a system is proposed, within the scope of the invention, which allows processing of media data (3) with current product and advertising information called up in real time, in contrast to the state of the art. This is made possible in that an XML file (4) is generated for a media file to be processed accordingly, in which file the data are compiled not statically, but rather dynamically, for example in the form of links. Furthermore, the system offers dynamic management of the system-related data in the form of tables that are dynamically connected with one another.

21 Claims, 3 Drawing Sheets

(56) References Cited

U.S. PATENT DOCUMENTS

2009/0297118 A1 12/2009 Fink et al.
2011/0060993 A1 3/2011 Cotter et al.
2011/0217022 A1* 9/2011 Miller et al. .................. 386/278

FOREIGN PATENT DOCUMENTS

| WO | | 2011/012898 A1 | 2/2011 | |
| WO | WO 2011012898 A1 | * | 2/2011 | ............. H04N 7/173 |

* cited by examiner

METHOD AND APPARATUS FOR PROCESSING OF MEDIA DATA

CROSS REFERENCE TO RELATED APPLICATIONS

Applicant claims priority under 35 U.S.C. §119(e) of U.S. Provisional Patent Application Ser. No. 61/687,460 filed on Apr. 25, 2012. Applicant also claims priority under 35 U.S.C. §119 of German Application No. 10 2011 055 653 filed on Nov. 23, 2011. The disclosures of each of the above applications are incorporated by reference.

BACKGROUND OF THE INVENTION

1. Field of the Invention

The invention relates to a method and an apparatus for processing of media data.

2. Description of the Related Art

A method for display of data concerning selected image elements of images of a video sequence is known from DE 10033134 34. Within the scope of the previously known method, a so-called raw video sequence is processed with a time track, in order to thereby produce linking of selected image elements within the raw video sequence. In this connection, a digital or analog video sequence is provided with a time track, in which markers are placed, which mark the time point of the display of the selected image element. These data in turn are linked with data and image coordinates that can then be selected when the video sequence that has been processed in this manner is played. With the selection, the data compiled for the selected image element are then displayed. In this way, it is supposed to be made possible to interactively offer advertising messages and ordering possibilities to the user, in each instance. The system is primarily intended to serve for processing television content, so that the user, if he/she is in possession of a set-top box, is enabled to interactively react to the screen offers and to call up advertising messages or ordering possibilities.

It is felt to be a disadvantage of this previously known system that the data linked with the so-called raw video sequence, in rather laborious manner, are compiled statically, so that there is a risk that during later repeated broadcasting of the video sequence, for example, the advertising messages or ordering possibilities can already be obsolete.

SUMMARY OF THE INVENTION

In contrast to this, the invention is based on the task of creating a method for processing of media data that is designed dynamically, not only in the phase of processing the media data but also in the management and offering of the processed media data, so that the data being offered are current, in each instance.

This is made possible, according to one aspect of the invention, in that a media file is first processed in that an XML file is generated, while the media file is being played, which file contains, among other things, a definition of the selected objects and of the description of the selected objects, which in turn are displayed or offered for call-up by means of linking of the media file with the XML file, at the time of display of the selected objects, whereby the data offered in the XML file in turn, however, are connected with the current data of an online shop, for example, in such a manner that the price information at the time of display of the offer is called up at the connected online shops. In this regard, the XML file does not comprise concrete data, but rather one or more Internet addresses of a server that controls the offer or of directly connected online shops, so that in this manner, it is ensured that the offers, in each instance, are presented in real time, at the time of inquiry by the user.

In an alternative embodiment, a time point is established again in the XML file that has already been mentioned or in another suitable file format, which time point correlates with the media file in such a manner that when an image or text datum is displayed in the media file, for which additional data are available, a link with the additional data is compiled in this XML file. When the media file is then played, an image element is displayed in an additional slider, in other words independent of the media file, which element the user can then select, with the consequence that the compiled additional data are displayed in another additional image bar, in other words, the connection to an online shop, in particular, can be produced.

The advantage of offering the image datum in an additional slider consists in that this image datum can be completely uncoupled from the media file and from the format of the media file, in other words, even data that are not presented in the media file at all, or are presented in a different form, can be displayed, for example.

In a concrete embodiment, in other words, corresponding links to every sales offer or to every online shop are compiled in the XML file, which are queried and displayed at the time of call-up of the offer, in each instance.

In an advantageous further development of the invention, the processed media file is linked with a "logging and tracking" file, with which the user behavior, in each instance, is provided, for example for the purpose of settling accounts with connected online shops.

In a concrete further development, the number of call-ups of the processed media files, the number of the selected objects, and/or the call-ups of the sales offers filed for this purpose, as well as the sales made within the scope of the offers submitted, are automatically recorded by means of the aforementioned "logging and tracking" files.

In a further development, the "logging and tracking" file has an evaluation unit assigned to it, with which the recorded user behavior can be directly processed and evaluated statistically.

In an advantageous further development, the method according to the invention is carried out, in connection with an apparatus for processing of the media data, whereby this apparatus comprises a player for playing of any desired media data, but preferably of flash files. The player offers a selection apparatus, among other things, with which any desired objects of the media file can be selected for the purpose of processing the played media files, whereby then, a time or location stamp that clearly identifies the object within the media file is automatically generated and compiled in the XML file. Furthermore, the apparatus has an interface that can be used to prompt the user, either automatically or due to a corresponding request by the system, in the event of selection of an object, to compile additional data in the XML file assigned to the media files. This preferably involves product data, for example by means of a product image or a product description, as well as the compilation of links to the product offer, in each instance, or to the connected online shops, whereby in this case, the Internet addresses required in this regard are entered into the system.

In yet another further development of the method according to the invention and of the apparatus according to the invention, the apparatus comprises management of the processed media files, which management is compiled in a total of at least seven tables linked with one another. The contents of the system are listed in the tables, in each instance, in other words, for example, a table of the media files processed within the scope of the system, a table that contains the data concerning the connected online shops, a table that comprises the data concerning the products offered, as well as the tracking table that has already been mentioned, which provides information about the user behavior, in each instance.

The advantage of the management described here consists in that the tables for management of the system data are linked with one another in such a manner that in the event of a change in individual data, in other words, for example, the Internet address of an online shop or the price data concerning a product, it is sufficient to enter the changed data into the system at a location in a table, whereby then, the correspondingly changed data are automatically taken over into the tables that require the identical data. In this way, it is ensured that the data offered to the user are always correct and current, and take place in real time.

Furthermore, a method for billing and financing of the method according to one aspect of the invention is proposed within the scope of another aspect of the invention. According to the solution according to the invention, the online shops that are served and connected within the scope of the method are obligated to pay commissions to the vendor of the method, as a function of the user behavior and/or the sales achieved.

In an advantageous embodiment, for this purpose, the method is provided with a tracking table that records and evaluates the user behavior, whereby billing of the commissions can take place automatically, on the basis of the recorded user behavior, within the scope of the method.

For this purpose, in a further embodiment of the method according to the invention, data concerning the type as well as the percentage of the commissions to be paid are compiled in the online shop table, so that individual data are compiled for every connected shop, and thus an individual settlement of commission accounts can take place. For example, it is possible that individual online shops already pay for the traffic achieved, in other words the call-ups of the online shop by users, and/or pay commissions as a function of the sales achieved by way of these call-ups. In this manner, individual conditions can be agreed to with the connected shops, and they can be billed automatically.

In another embodiment, not only the temporal length but also the number of product call-ups and the goods purchased within the scope of this method are recorded separately for each online shop, and compiled in the tracking table.

For this purpose, it is necessary that the call-ups of the users of the method according to the invention are not switched directly to the server of the online shop operator, in each instance, but rather instead, the call-up takes place with the interposition of the server of the vendor of the method, who thereby has the possibility of recording the user behavior, in each instance, using a tracking module, to compile the results of this evaluation in the tracking table, and to thereby automatically draw up an account statement for each online shop individually. The tracking table is also absolutely necessary for the purpose of the required documentation provided to the connected online shops.

The additional data offered are also provided to the user by way of the vendor's server, and displayed in a separate screen bar, so that the additional data are also completely uncoupled, spatially and technically, from the media file, in each instance.

In an advantageous further embodiment of the invention, the media files processed according to the method according to the invention can also be tied in, by third parties, into their home page, by way of usual embedding, so that the media files can then be played on the home page of the third party, by way of so-called framing.

Also in the event that the media file is played on the home page of a third party, image data independent of the media file are then displayed by way of an additional slider, triggered by means of the XML file; the user can then call up additional data concerning the image being offered, in each instance, on the home page of the third party. Although the display of the media file and of the slider now takes place on the home page of a third party, the selection of the additional data by way of the slider leads to a call-up of the additional data from the server of the vendor. This is ensured by means of corresponding linking.

In a further embodiment of the invention, the player developed for processing of the media files can also be used by means of access to the server of the vendor of the method according to the invention, and in this way, predetermined media files or also the user's own media files can be processed by the user in the sense of the method, in other words additional data can be assigned to the media file, and the additional data can be offered for selection by a subsequent user by means of an image element in a separate slider. With a correct understanding, the user of the player therefore works on the server of the vendor, in order to process his/her own media files or media files that have already been selected, in the sense of the method according to the invention. However, the user can take his/her own preferences into consideration in this connection.

In a further embodiment of the invention, however, the user's freedom in storing of the additional data can be restricted by means of a set of rules compiled on the server of the vendor. Fundamentally, in this connection, any type of set of rules is possible. In an advantageous embodiment, however, the set of rules suppresses the offer of direct competition prohibitions, in such a manner that the selection of the additional data that are subsequently available and are to be selected by the user in connection with the media file to be processed is restricted in such a manner that additional data that collide with the additional data selected previously, in terms of time, for example, can no longer be selected. However, in a further embodiment of the method, a previous selection can be canceled to thereby allow other additional data to be displayed, which were previously excluded due to the collision prohibition. In other words, only the offer of colliding data in connection with a single processed media file is supposed to be prevented with the set of rules. In media files that are independent of one another, other combinations can, of course, also be selected.

According to another aspect of the invention, image data can also be processed according to the method according to the invention, in that so-called pins are assigned to the corresponding image data, which in turn are clearly linked with the objects, particularly products, shown in the image, and stored. In a further step, object data, as described above, can then be generated for every object, whereby the object data are preferably offers of connected online shops. The object data available in this regard are stored in an XML file or another suitable file format, and are subsequently firmly linked with the corresponding processed image file.

As soon as the correspondingly processed image file is called up at a later point in time, the pins compiled in the image become visible during a "mouse-over event" or another "event" within the scope of which the mouse or another selection element passes over the image or the objects selected by means of the pins, whereby then, in a further "mouse-over event" or other "event," the displayed pins can be selected, with the result that the object data clearly assigned to the pins are displayed in a separate screen bar and/or in another manner, whereby then, in turn, the vendor of the selected product, particularly one or more online shops linked with the system, can be directly called up by the user, in each instance, by way of a selection of the displayed object data or an additional button.

Also in connection with the method for preparation of image files, it is possible that this method is also opened up for third parties, in that the processing software is given to third parties, so that these are able to compile pins in the image files, so that the pins are then compiled in connection with predetermined or freely selectable object data, in an XML file assigned to the image file, in each instance, or in another suitable file format.

In an advantageous embodiment of this solution, the system furthermore has a database assigned to it, in such a manner that in the event that the third party compiles pins for an object for which no supplemental object data are present, comparison products are offered by means of a corresponding search algorithm that is assigned to the database, so that their object data can be assigned to the object selected in the image, in each instance, so that they become visible to users at a later time, when the image file prepared by the third party accordingly is called up.

BRIEF DESCRIPTION OF THE DRAWINGS

In the following, the invention will be explained in greater detail using an exemplary embodiment shown in the drawings. In this connection, the range of protection of the invention is defined exclusively by the scope of protection of the claims, whereby the following example merely designates a possible embodiment within the scope of the invention.

The figures show.

DETAILED DESCRIPTION OF THE PREFERRED EMBODIMENTS

Figure 1:
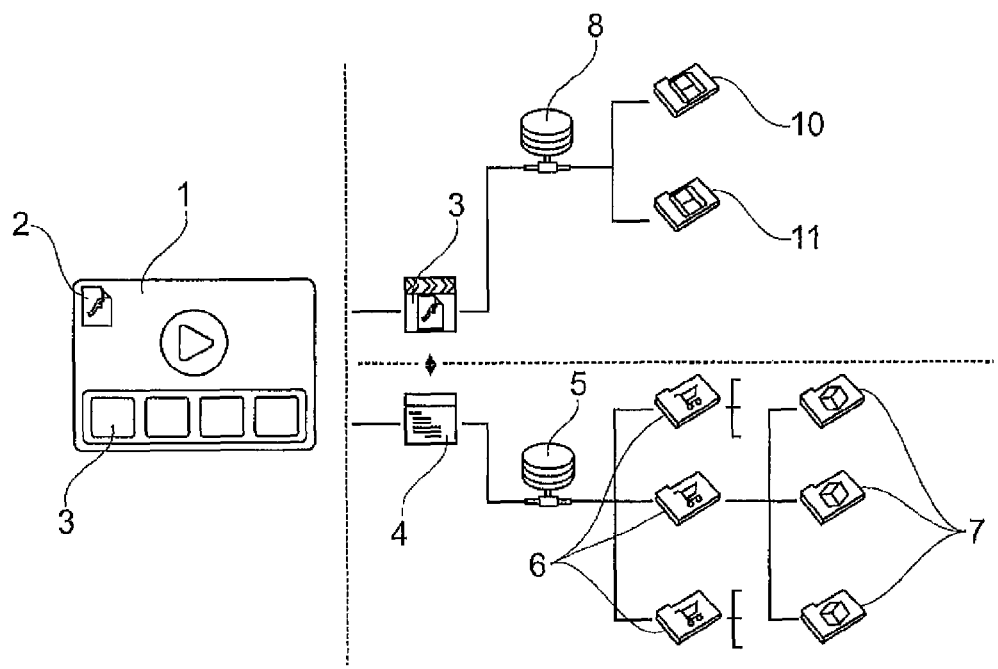
FIG. 1 an overview representation of the system according to the invention.

According to the overview representation in FIG. 1, a media file processed according to the invention can be played on a conventional flash player 1 of a usual browser, on a commercially available computer. In this connection, the correspondingly processed media file comprises, in a manner not evident to the user, first of all a conventional flash stream 2, which was processed with other media data 3 assigned to the individual image sequences or image elements. The media data 3 that are assigned to the flash stream 2, correctly in terms of time and/or location, are compiled in an XML file 4. In this connection, the XML file 4 accesses a product database 5 compiled in the system, which is dynamically updated in real time, in the event of a call-up by the user, which will still be explained below. In this connection, the product database 5 is served by connected online shops 6, whereby if applicable, one or more of the connected online shops 6 can offer one or more product(s) 7 in the product database 5.

The real-time quality of the product offers is ensured in that not only the product data but also the online shop data, in each instance, are compiled in the XML file 4 in the form of links, so that any updates of the connected online shop 6 or of the data compiled in the product database 5 concerning a product 7 are offered with the status of the corresponding data at the time of the call-up by the user, in each instance, at the time the flash stream 2 is played on the flash player 1.

In this connection, the correspondingly processed media data can be obtained from a collection of the processed media files 8 that is also compiled in the system. In this connection, the processed media data can be compiled on the server of the vendor 10, in each instance, or can be compiled externally, for example distributed in the Internet, or in a cloud 11.

Figure 2:
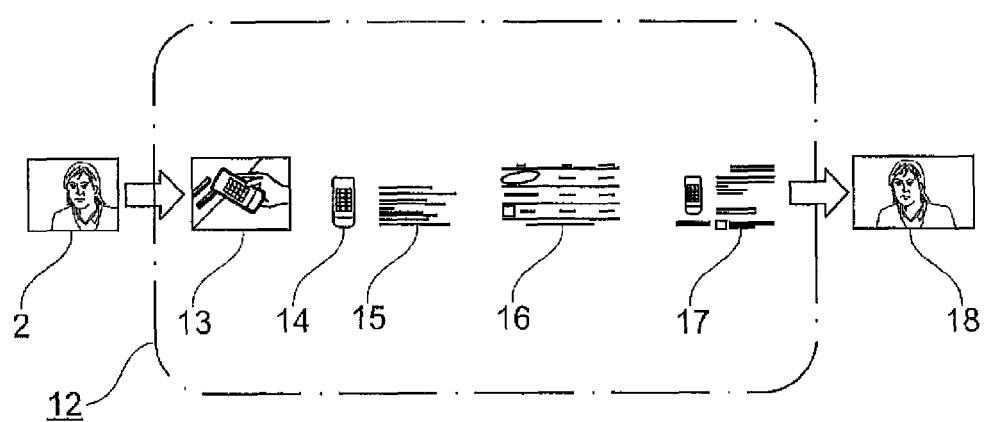
FIG. 2 a work-flow representation for processing of the media data.

FIG. 2 shows an example of the processing of conventional media data 3, in other words, for example, of a flash stream 2, by way of an interface 12 made available specifically for this purpose. First, an object can be defined in a selection step 13, using this interface 12, for example within the scope of a music video present in the form of a flash stream 2, for example by way of a mouse click. At this point in time, the object, in each instance, is automatically compiled in the system, with an object identification such as a time stamp that indicates the point in time when the object is displayed in the media file to be processed. The user is now prompted, by way of a query mode, to enter the object data required for the selected object, for example an object image 14 or an object description 15, into the system. In a further step, the related vendor data 16 concerning the selected object are then entered into the system in the form of corresponding links. In the case of multiple vendors, a ranking tool 17 can be activated, in addition to the vendor data 16; this tool presents the offers, in each instance, to the user either as a function of the vendor defaults or the user defaults, in a defined sequence, in other words with a preference for the most advantageous vendor, in each instance.

After this step, the media file is already processed in the sense of the invention, so that it is a processed media file 18, in other words a media file that is linked with a corresponding XML file 4.

Figure 3:
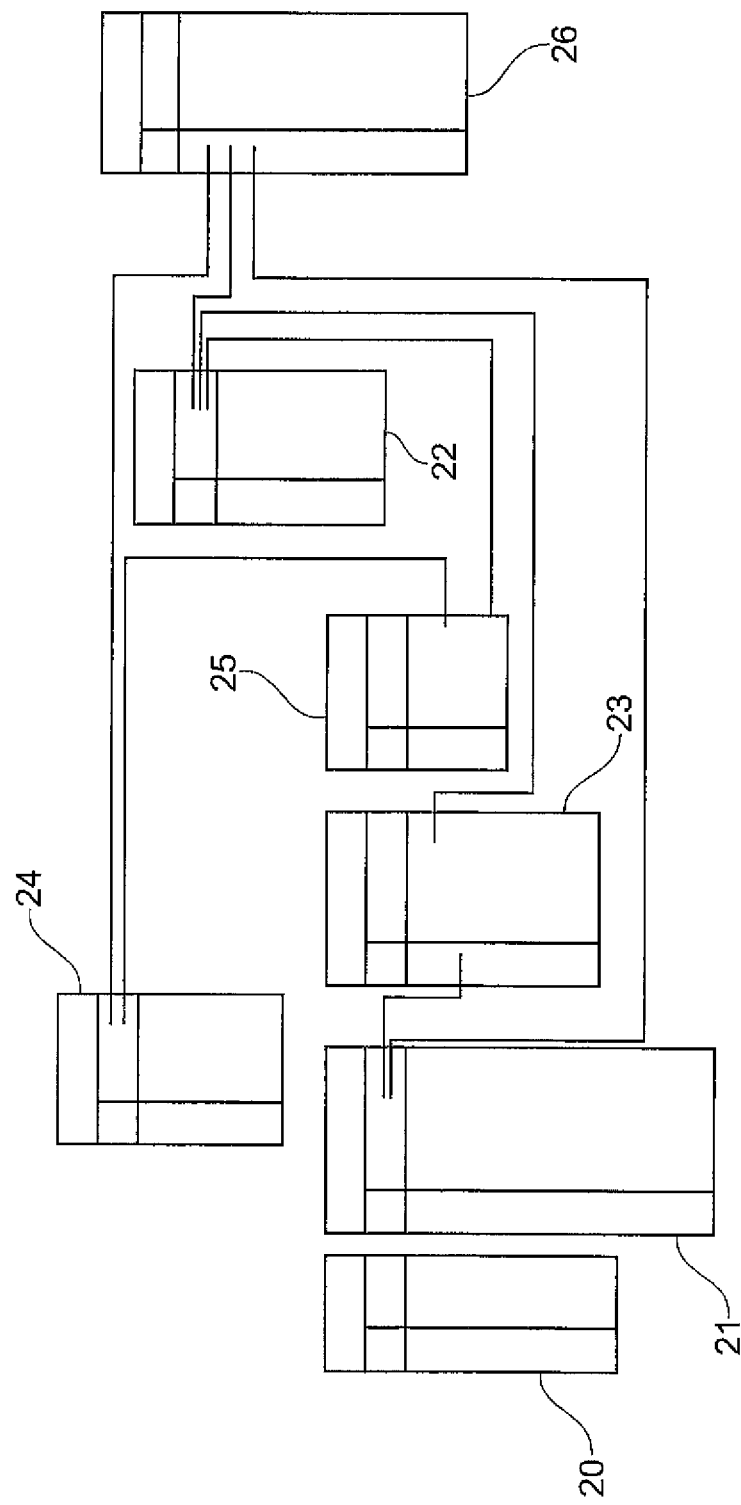
FIG. 3 an overview concerning management of the data compiled within the scope of the system, in the form of tables linked with one another, and FIG. 4 an overview representation of an alternative embodiment of the method for display of additional data.

According to FIG. 3, storing and management of the processed media files takes place by way of a system of dynamic tables that are linked with one another.

First of all, the system comprises a media data table 20, in which all the data of the processed media files 18 are compiled. These include, among other things, the name of the file, the type of file, the length of the file in terms of time, the memory space required to compile the file, a screen shot for a visual designation of the file, as well as a unique key that indicates the file in question.

A second table, namely the online shop table 21, comprises all the data of the online shops 6 included in the system, in other words, in particular, their name, logo, contact data, as well as a unique ID of the online shop in question. Furthermore, commission data and data as to whether or not the online shop is active at that time can be compiled in the online shop table 21.

Another table of the system is the product table 22, which contains data concerning all the products 7 that can be offered within the scope of the system. These particularly include the name of the product, a product description, as well as a product photo, if applicable, and a unique key for naming the product.

All the data about the shops that market a specific product 7 are compiled in the product shop table 23. For this purpose, the IDs of the shops that offer the product in question are compiled in the product shop table 23 for every product 7, defined by its product ID. In this connection, the shop ID is linked with the related product price, the shipping costs, and, if available, a product evaluation. The direct product links to the shops in question are also compiled in the product shop table 23, whereby this compilation takes place indirectly, in order to be able to perform the tracking functions, which will still be explained later, in this manner.

The data required when calling up a correspondingly processed media file are brought together in the content table 24, in real time. The content table 24 therefore contains, first of all, a movie ID for calling up the selected video clip, as well as a unique key, a time stamp that designates the latest update that took place for the media file, as well as a further datum that makes it clear whether the required XML file 4 already exists for this media file, and whether the processed media file 18 is still active or is inactive.

The product data, in each instance, are linked with the time point of their appearance in the media file, in each instance, in the product time point table 25. For this purpose, a so-called content ID is compiled in the product time point table 25, which ID designates the content to be displayed at a defined time point, as well as a time datum that indicates when the product is to be displayed in connection with the video, and the product ID of the product to be offered at this time point. The product data that belong to the product ID as such are derived from the product shop table 23 that has already been mentioned, in real time.

The data recorded for the purpose of reporting, at the time of use of the processed media file, are compiled in a seventh table, namely the tracking table 26. For this purpose, the tracking table 26 comprises the content ID that has already been mentioned, the product ID, as well as the shop ID and further data concerning the user behavior in connection with the aforementioned IDs, in other words, for example, the click behavior of the user, the purchased goods purchase value, the browser used, as well as the country of origin of the user. All these data, in turn, are compiled in connection with a time stamp.

Above, a system has therefore been described, which first of all allows processing of media data of any desired kind, in such a manner that objects displayed within the scope of the media file can be provided with more detailed data, particularly sales and advertising information, whereby an interface is made available for this purpose, which allows the corresponding processing of the media data, in simple manner.

Furthermore, the system is designed in such a manner that the additional data offered to the user are imported in real time, in each instance, and therefore it is highly likely that they are current and applicable.

The system is further accompanied by an advantageous management that ensures that any datum, once it has been imported, is automatically updated and entered at all locations that require the updated data. This is ensured by means of a dynamic table management system.

Finally, the system is also accompanied, in advantageous manner, by a reporting module that allows an analysis of the user behavior and of the sales activities that are handled within the scope of the system.

Figure 4:
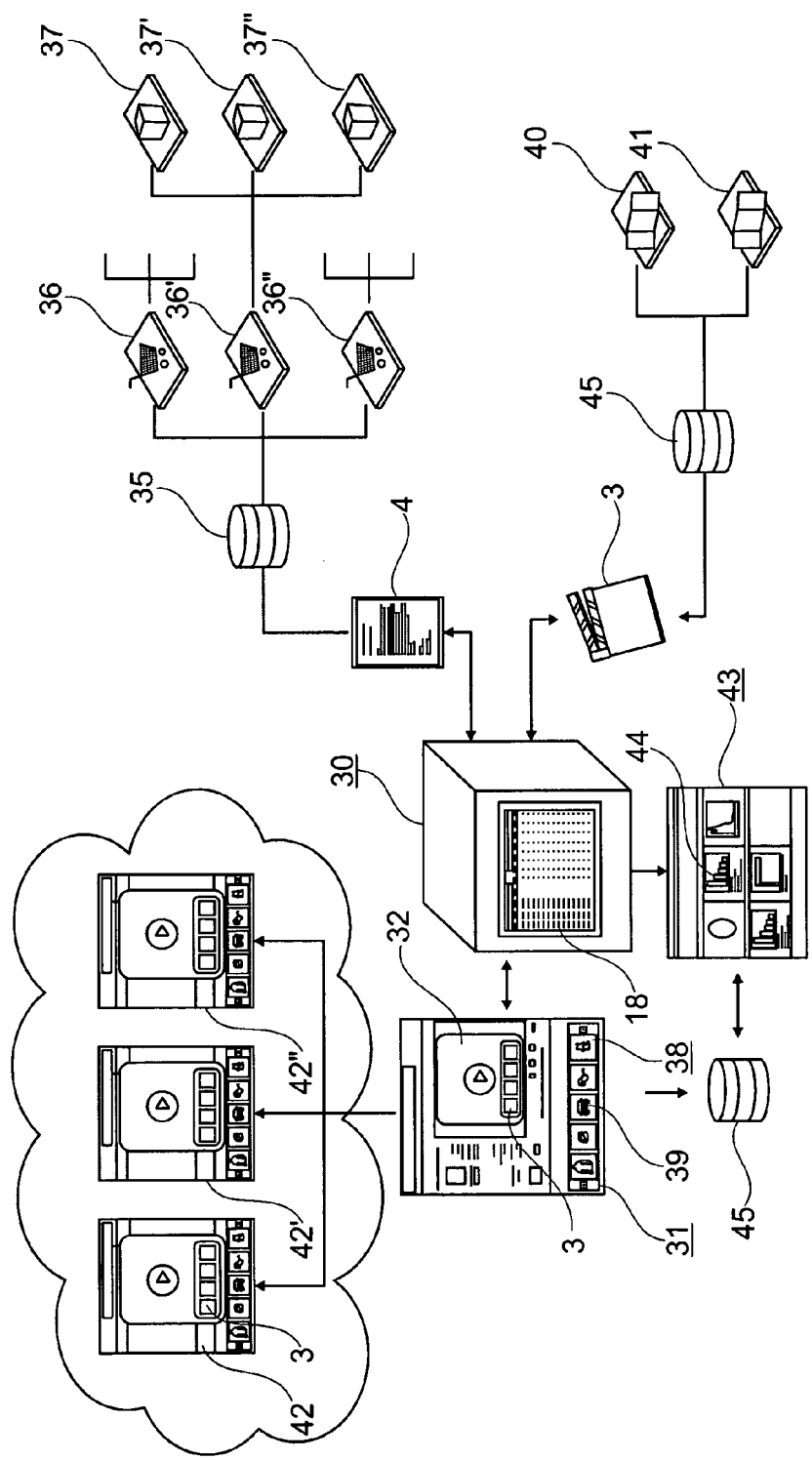

FIG. 4 shows an alternative embodiment of the method according to the invention, in another overview representation.

The control center of this method is the server of the vendor 30, on which processed media data 18 are also compiled, as has already been described. The server serves an Internet platform 31, on which a player 32 runs, which can be used to process the media files 3, as has already been described. A media file 3 played by way of the player 32 can be enriched by means of the compilation of an additional file, particularly an XML file 4, in such a manner that a time stamp is assigned to the display time point of specific objects, so that these objects are uniquely defined, and a link to an image element 39 established by means of the player 32 is selected by way of the XML file 4, which element is then offered when the media file 3 is played, by way of the player 32, in a separate slider 38, at the same time as the time point established in the time stamp. In the event that this image element 39, which is completely uncoupled from the media file 3, is then selected by the user, additional data in connection with the media file 3 are then displayed, once again by way of the server of the vendor 30 of the method. In this connection, the link in the XML file 4 is called up with the selection of the offered image element 39 by the user, and then the additional data are obtained from a product database 35. Usually, selected online shops 36, 36', 36" are connected with the product database 35, whereby for every online shop 36, 36', 36", the products 37, 37', 37" offered by this online shop are also compiled. Of course, the selection of the connected online shops 36, 36', 36" as well as the products 37, 37', 37" offered by these online shops can be changed by way of the control center 30, at any time.

When the player 32 is called up for processing of the media files 3, these media files are also obtained by way of the control center 30, in other words with the interposition of the vendor, who makes a media database 45 with suitable media files 3 available for this purpose. In this connection, the media files 3 that are contained in the media database 45 can be made available either by the actual vendor of the system, in other words from internal sources 40, or from external sources 41.

Within the scope of the method according to the invention, it is specifically supposed to be possible for external users to have access to the player 32, by means of using the Internet platform 31, so that external users can also process media files 3 in the sense of the method according to the invention, and can enter them into the media database 45 as an external source 41. In this connection, the first thought is, in the sense of the invention, that the external users of the player 32 undertake linking with the predetermined products 37, 37', 37" of the connected online shops 36, 36', 36". In this connection, it is avoided, by means of a set of rules compiled in the control center 30, that in the case of the media data processed by external users, direct competition products are offered in connection with one and the same media file 3. This is made possible in that the selection of a product offered earlier, in terms of time, restricts the selection of the products to be selected subsequently, in such a manner that direct competition products can no longer be compiled in the XML file 4. However, the user is free to change selections that have already been made previously, in order to bring other products back into play, if applicable, or to take into consideration the other products in connection with repeated processing of a different or even the same media file 3, whereby this renewed processing then has to take place, once again, in accordance with the rules of the set of rules of the control center 30, which is predetermined in fixed manner.

In another embodiment, the processed media files can be played not only on the Internet platform 31, but rather the media files 3 can also be played by way of so-called embedding, on other servers and other home pages, whereby it is ensured, by way of the XML file 4, that the additional data are always obtained only with the interposition of the control center 30 of the vendor of the method according to the invention. In this connection, the media data 3 is usually played on the home pages and servers of third parties 42, 42', 42" by way of so-called framing, in other words only indirectly on the server of the third party. As a result, it is ensured, also in the interests of the third parties, that no direct data exchange takes place between the server of the third party, the media file 3, or the control center 30. The users, who either decide to process their own or already existing media files by means of use of the Internet platform 31, or have the already processed media files run on their own home pages 42, 42', 42", therefore act more or less as multipliers of the system.

Since, as has already been described, it is ensured that all the interactions in connection with calling up the media files 3 and the additional data connected with them take place exclusively by way of the control center 30, it is practical if this control center 30 in turn is provided with a "reporting and tracking" tool 43 that records all the interactions that run by way of the control center 30 and, in this connection, undertakes corresponding evaluations for subsequent billing of the commissions to the connected shops. The data generated in this connection are compiled in a report database 44 that stands in a direct data connection with the "reporting and tracking" tool 43.

REFERENCE SYMBOL LIST

1 flash player
2 flash stream
3 media data
4 XML file
5 product database
6 online shop
7 product
8 collection of the processed media data
10 vendor-side server
11 cloud
12 interface
13 selection step
14 object image
15 object description
16 vendor information
17 ranking tool
18 processed media file
20 media data table
21 online shop table
22 product table
23 product shop table
24 content table
25 product time point table
26 tracking table
30 server of the vendor/control center
31 Internet platform
32 player
35 product database
36, 36', 36" connected online shops
37, 37', 37" products
38 slider
39 image element
40 internal source
41 external source
42, 42', 42" external home pages
43 "reporting and tracking" tool
44 report database
45 media database

What is claimed is:

1. An apparatus for management of media files processed according to a method having the following steps:
    playing of the unprocessed media file on a player suitable for the media file, in each instance,
    recording of selected objects of the media file,
    generation of object data concerning the selected objects, and
    their compilation in an XML file or in another suitable file format,
    wherein this XML file or the other file contains a time stamp for every selected object, which comprises the display time and duration of the selected object in the media file to be processed, and/or a location stamp, which designates the location of the display of the selected object in the media file, as well as an object description, which comprises a visual object reproduction, as well as sales information concerning each selected object, comprising at least one offer of an online shop concerning the selected object,
    linking of the media file with the XML file or the other file, in such a manner that at the time point of display of the selected object, in each instance, in the media file, display of the object data is offered and/or takes place automatically,
    and then, as a function of the user reaction, for example in the form of a mouse click, the sales information is additionally displayed,
    wherein said apparatus comprises at least seven tables connected with one another, namely
    a media data table with the data of the media files,
    an online shop table with the data of the connected online shops,
    a product table with the data of the offered products in each instance,
    a product shop table with the data concerning designation of the product offer in each instance,
    a content table with the data of the complete offer of the products offered within the scope of the processed media files in each instance, a time stamp of the offer in the media file, in each instance, as well as a time stamp of entry of the processed media file into the system,
    a product time point table of the products offered in the system,
    a tracking table with the recorded user data, in each instance, broken down, in each instance, by online shop ID and/or product ID.

2. The apparatus according to claim 1, wherein with the selection of the sales information by the user, a link compiled in the XML file, with one or more sales offers of one or more online shops is called up and an offer of the online shops that are called up is displayed in real time.

3. The apparatus according to claim 1, wherein on the vendor side, the processed media file is automatically compiled with a "logging and tracking" file for recording the user behavior.

4. The apparatus according to claim 3, wherein at least the number of call-ups of the processed media data, the number and identification of the selected objects and/or of the call-up of the sales information, as well as the sales actions undertaken are recorded in the "logging and tracking" file.

5. The apparatus according to claim 4, wherein the "logging and tracking" file has an evaluation unit assigned to it, for evaluation and processing of the recorded user behavior.

6. The apparatus according to claim 1, further comprising a player for playing the media data, a selection apparatus for selection of any desired objects of the media data, as well as an interface that automatically generates a time and/or location stamp of the selected object in the event of selection of an object by means of the selection apparatus, and compiles it in an XML file, and then supports or demands entry of defined additional data concerning the selected object, for example image and price information, as well as linking with one or more online shops, by means of entry of the corresponding Internet addresses of the online shops in question, wherein the object data called up in this way are then compiled in the XML file, in the sequence of the display of the objects in the processed media file.

7. The apparatus according to claim 1, wherein the tables are linked with one another in such a manner that entry or change of a table content is automatically taken over into all the other tables that comprise the same table content.

8. The apparatus according to claim 1, in which the additional data that can be called up by way of the link in the XML file are obtained from the server of the vendor and displayed in a further, separate screen bar.

9. The apparatus according to claim 1, in which the processed media data can be offered also by third parties, on their home page, by the framing method, by way of embedding.

10. The apparatus according to claim 9, wherein in the event of a call-up of a link from the XML file or from another suitable file on the home page of a third party, the object data are in turn obtained from the server of the vendor.

11. The apparatus according to claim 1, wherein the player is also issued to third parties, for processing of the media data, wherein then third parties can process the media data selected by the player, with the interposition of the server of the vendor, in such a manner that in turn, links to additional data are placed within the scope of the XML file created during processing, which data are obtained from the server of the vendor at defined points in time during playing of the media file on the home page of the third party.

12. The apparatus according to claim 11, wherein the additional data to be linked in by a third party, by way of a link, are offered by the server of the vendor, in accordance with a set of rules established by the vendor at least in connection with a selected media file.

13. The apparatus according to claim 1, wherein one or more selected objects of an image can be selected by means of a mouse click, for example, in that one or more pins are set by means of a mouse click or in another manner, by means of "drag and drop," and these pins can be stored in connection with the image data, wherein an object is clearly assigned to each pin, and object data can be generated for this object, which data are stored in an XML file or in another suitable file format.

14. The apparatus according to claim 13, wherein subsequently, these object data are assigned to this image, in such a manner that when this image is called up during a "mouse-over event" or some other "event," the pins become visible and during another "mouse-over event" or other "event" over a pin, the product, in each instance, is displayed in a separate screen bar and/or in some other way, whereby then, one or more linked online shops can be called up by way of a further selection of the displayed product.

15. The apparatus according to claim 13, wherein image data can be processed by third parties by means of the compilation of pins, and wherein predetermined or freely selectable object data are assigned to these image data by the third parties, which data are in turn stored in an XML file or another suitable file format.

16. The method according to claim 15, wherein in the event that no product data are present for a selected object, object data of a comparable product are offered for selection by the third party, by means of a connected database.

17. A management method for management of media files wherein the media files are processed by a processing method having the following steps:
playing of the unprocessed media file on a player suitable for the media file, in each instance,
recording of selected objects of the media file,
generation of object data concerning the selected objects, and
compilation of a link to these object data in an XML file,
wherein this XML file contains a time stamp for every selected object, which comprises the display time and duration of the selected object in the media file to be processed, and/or a location stamp of the selected object in the media file, as well as an object description, as well as sales information concerning each selected object,
linking of the media file with the XML file, in such a manner that at the time point of display of the selected object, in each instance, in the media file, an image display additionally takes place, in a slider independent of the media file, and the display of the object data relating to this image display is in turn offered in an object data file independent of the media file and/or takes place automatically,
and then, as a function of the user reaction or automatically, for example in the form of a mouse click, the sales information is additionally displayed, separate from the media file and the slider,
wherein with the selection of the sales information by the user, a link compiled in the XML file with one or more sales offers of one or more online shops is called up, and an offer of the called-up online shops is displayed in real time, in each instance,
wherein the connected online shops pay a commission to the vendor of the method and/or a base fee independent of the user behavior, for the call-up of their shop and/or for the sales carried out within the scope of this call-up,
wherein the managing method comprises at least seven tables connected with one another, namely
a media data table with the data of the media files in each instance,
an online shop table with the data of the connected online shops,
a product table with the data of the offered products in each instance,
a product shop table with the data concerning designation of the product offer in each instance,
a content table with the data of the complete offer of the products offered within the scope of the processed media files in each instance, a time stamp of the offer in the media file, in each instance, as well as a time stamp of entry of the processed media file into the system,
a product time point table of the products offered in the system,
a tracking table with the recorded user data, preferably comprising the number of user call-ups of the connected online shop IDs, the called-up product IDs, the country identifier of the user, as well as the ordering volume of the user, in each instance, broken down, in each instance, by online shop ID and/or product ID,
wherein in addition, the commission type and the percentage of the commission are compiled in the online shop table, and billing of the commissions and/or of the fees independent of user behavior to the online shop, in each instance, is automatically drawn up as a function of these recorded data, as a function of the user behavior, in each instance.

18. The management method according to claim 17, wherein on the vendor side, the processed media file is automatically compiled with a "logging and tracking" file for recording the user behavior, and that billing of the commissions to the online shops is drawn up on the basis of this "logging and tracking" file.

19. The management method according to claim 17, wherein all the data such as the number and/or the time period or the time length of the product call-ups, the number of call-ups, and the purchased goods value are saved in the tracking table.

20. The management method according to claim 17, wherein the prices, shipping costs, or ratings of the products, in each instance, as well as the link to the online shop, in each instance, are compiled in the product shop table, wherein the call-up of the link takes place not directly, but rather with the interposition of the server of the vendor of the method, in order to record the user behavior by means of a tracking module and to compile the data obtained in this manner in the tracking table.

21. An apparatus for management of media files processed according to a method having the following steps:
   playing of the unprocessed media file on a player suitable for the media file, in each instance,
   recording of selected objects of the media file,
   generation of object data concerning the selected objects, and
   their compilation in an XML file or in another suitable file format,
   wherein this XML file or the other file contains a time stamp for every selected object, which comprises the display time and duration of the selected object in the media file to be processed, as well as an object description, as well as sales information concerning each selected object,
   linking of the media file with the XML file or the other file, in such a manner that at the stored time point of display of the selected object, in each instance, in the media file, an image display additionally takes place, in a slider independent of the media file, and the display of the object data relating to this image display is in turn offered in an object data file independent of the media file and/or takes place automatically,
   and then, as a function of the user reaction, for example in the form of a mouse click, the sales information is additionally displayed, separate from the media file and the slider,
   wherein said apparatus comprises at least seven tables connected with one another, namely
   a media data table with the data of the media files,
   an online shop table with the data of the connected online shops,
   a product table with the data of the offered products in each instance,
   a product shop table with the data concerning designation of the product offer in each instance,
   a content table with the data of the complete offer of the products offered within the scope of the processed media files in each instance, a time stamp of the offer in the media file, in each instance, as well as a time stamp of entry of the processed media file into the system,
   a product time point table of the products offered in the system,
   a tracking table with the recorded user data, in each instance, broken down, in each instance, by online shop ID and/or product ID.

* * * * *